(12) United States Patent
Wang et al.

(10) Patent No.: US 11,377,065 B2
(45) Date of Patent: Jul. 5, 2022

(54) SAFETY AIRBAG, SAFETY AIRBAG ASSEMBLY AND METHOD FOR FOLDING SAFETY AIRBAG

(71) Applicant: Autoliv Development AB, Vargarda (SE)

(72) Inventors: Shuangyang Wang, Shanghai (CN); Liang Wang, Shanghai (CN); Jin Zhang, Shanghai (CN)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/260,392

(22) PCT Filed: Jun. 19, 2019

(86) PCT No.: PCT/CN2019/091849
§ 371 (c)(1),
(2) Date: Jan. 14, 2021

(87) PCT Pub. No.: WO2020/019907
PCT Pub. Date: Jan. 30, 2020

(65) Prior Publication Data
US 2021/0261087 A1 Aug. 26, 2021

(30) Foreign Application Priority Data
Jul. 24, 2018 (CN) .......................... 201810818412.4

(51) Int. Cl.
*B60R 21/237* (2006.01)
*B60R 21/232* (2011.01)

(52) U.S. Cl.
CPC .......... *B60R 21/237* (2013.01); *B60R 21/232* (2013.01)

(58) Field of Classification Search
CPC ... B60R 21/237; B60R 21/232; B60R 21/201; B60R 21/213; B60R 21/23138; B60R 21/214
(Continued)

(56) References Cited

U.S. PATENT DOCUMENTS

2008/0315565 A1* 12/2008 Kawabe ................ B60R 21/239
280/728.2
2010/0295277 A1* 11/2010 Ochiai .............. B60R 21/23138
280/729
2020/0298788 A1* 9/2020 Wang .................... B60R 21/237

FOREIGN PATENT DOCUMENTS

CN 1495073 A 5/2004
CN 1618664 A 5/2005
(Continued)

*Primary Examiner* — Keith J Frisby
(74) *Attorney, Agent, or Firm* — Harness, Dickey & Pierce, P.L.C.; Stephen T. Olson

(57) ABSTRACT

Provided are an airbag, an airbag assembly, and a folding method for an airbag. The airbag has a first end, a second end, and a third end, wherein the third end is formed by folding the airbag between the first end and the second end, the second end and the third end are free ends of the airbag, and the first end is used for fixing the airbag to a mounting position. When in a stored state, the airbag has a first rolled portion and a second rolled portion, the second end is located in the first rolled portion, the third end is located in the second rolled portion, the second end is located outside of the second rolled portion, and the third end is located outside of the first rolled portion. The airbag can be stored in a mounting space in a vehicle more efficiently.

11 Claims, 6 Drawing Sheets

(58) Field of Classification Search
USPC .......................................... 280/728.2, 730.2
See application file for complete search history.

(56) References Cited

FOREIGN PATENT DOCUMENTS

| | | | | |
|---|---|---|---|---|
| CN | 1689875 | A | 11/2005 | |
| CN | 101195367 | A | 6/2008 | |
| CN | 102205829 | A | 10/2011 | |
| CN | 107235028 | A | 10/2017 | |
| DE | 102006041704 | A1 * | 3/2008 | ........... B60R 21/213 |
| JP | 4403913 | B2 | 1/2010 | |
| JP | 4996447 | B2 | 8/2012 | |
| WO | WO-2017166882 | A1 * | 10/2017 | ........... B60R 21/213 |

\* cited by examiner (1)  (2)  (3)  (4)

SAFETY AIRBAG, SAFETY AIRBAG ASSEMBLY AND METHOD FOR FOLDING SAFETY AIRBAG

TECHNICAL FIELD

The present invention relates to a safety device for vehicles, and in particular relates to an airbag, an airbag assembly, and a folding method for an airbag.

BACKGROUND

Airbags used in vehicles are important devices frequently used in emergency situations to protect occupants in vehicles from injuries. As one type of airbags, a curtain airbag is typically mounted at an upper portion of a side door and located at an edge of a vehicle structure under the inner roof. Moreover, the curtain airbag is inflated when a vehicle is impacted, so that it expands and is deployed in an inflated state against a vehicle side structure, such as a side window, inside the vehicle. In this way, the curtain airbag prevents occupants from directly hitting the exterior structures of the vehicle or being thrown out of vehicle windows, thus protecting the occupants from serious injuries. An example of such curtain airbag is shown in FIGS. 1 and 2. Specifically, FIG. 1 shows a state in which a curtain airbag 1 in a stored state is roll-folded and stored in a space under a vehicle side structure 3 (e.g., a side door) and an inner roof 2 when viewed in the length direction of a vehicle (i.e., a left-and-right direction of FIG. 1 is a width direction of the vehicle). FIG. 2 shows the curtain airbag 1 in a deployed state in which the curtain airbag is inflated and expanded in the length direction of the vehicle (i.e., a left-and-right direction in FIG. 2), and the airbag is deployed downward along the vehicle side structure 3, so as to provide protection for occupants in an occupant protection region.

Because the mounting space of the airbag is very limited, the airbag is typically mounted in a rolled state or a folded and stored state in a particular space of a vehicle. FIGS. 3A-3B and FIG. 4 respectively show two common rolling or folding manners for airbags in the prior art: a roll-folding manner (as shown in FIG. 3) and an N-shaped folding manner (as shown in FIG. 4). FIG. 3 shows a schematic side view of an airbag folded in the roll-folding manner. An airbag assembly folded in the roll-folding manner easily maintains its external shape. Therefore, when mounted to a vehicle, the airbag assembly can maintain its shape without additionally providing enclosures, such as a seal cover. However, the airbag assembly has a large diameter and thus often is unable to meet the requirement of limited mounting space in the vehicle. FIG. 4 shows that an airbag folded in an N-shaped folding manner has a flat cross section and occupies a small space in a vehicle; but the size of the airbag needs to be maintained with a seal cover 4. However, because the airbag folded in the N-shaped folding manner does not have a flat outer shape, the seal cover 4 usually needs to enclose the airbag substantially in the entire extended length of the airbag. It is thus difficult to reduce costs because of the requirement for a seal cover.

Therefore, an airbag folded in an existing airbag folding manner occupies a large space in a vehicle, and mounting and fixing such airbags are costly.

SUMMARY

In order to solve the above problems, the present invention provides an airbag, wherein the airbag has a first end, a second end, and a third end, wherein the third end is formed by folding the airbag between the first end and the second end, the second end and the third end are free ends of the airbag, and the first end is used for fixing the airbag to a mounting position; and the airbag has a first rolled portion and a second rolled portion when in a stored state, wherein the second end is located in the first rolled portion, the third end is located in the second rolled portion, the second end is located outside of the second rolled portion, and the third end is located outside of the first rolled portion.

According to an embodiment of the present invention, the first rolled portion and the second rolled portion have the same rolling direction.

According to an embodiment of the present invention, when the airbag is in a stored state, the cross-sectional area of the first rolled portion is equal to that of the second rolled portion.

According to an embodiment of the present invention, when the airbag is in a stored state, the first rolled portion and the second rolled portion abut against each other.

According to another aspect of the present invention, further provided is an airbag assembly, comprising:
a gas generator; and
the aforementioned airbag.

According to an embodiment of the present invention, the airbag assembly further comprises:
a mounting device configured to fix the airbag to a corresponding mounting position, the mounting device being fixed to the first end of the airbag.

Preferably, according to an embodiment of the present invention, the mounting device is configured as a fastener surrounding the airbag; and a portion of the fastener is fixed to the first end of the airbag assembly.

According to another aspect of the present invention, further provided is a folding method for an airbag, the airbag comprising a first end and a second end, the first end being used for fixing the airbag to a mounting position, and the second end being a free end of the airbag; and the folding method is characterized by comprising the steps of:
moving the second end close to the first end to fold the airbag, so as to form a third end of the airbag; and
rolling a portion of the airbag by respectively using the second end and the third end as starting points, so as to form a first rolled portion and a second rolled portion, wherein the second end is located outside of the second rolled portion and the third end is located outside of the first rolled portion.

The airbag of the present invention can occupy a mounting space in a vehicle more efficiently.

BRIEF DESCRIPTION OF THE DRAWINGS

The present invention will be described in detail below with reference to the accompanying drawings.

DETAILED DESCRIPTION

Specific implementations of an airbag, an airbag assembly and a folding method for an airbag according to the present invention will be described below with reference to the accompanying drawings. The detailed description and drawings below are used for exemplarily illustrating the principle of the present invention. The present invention is not limited to the described preferred embodiments. The protection scope of the present invention is defined by the claims.

Figure 5:
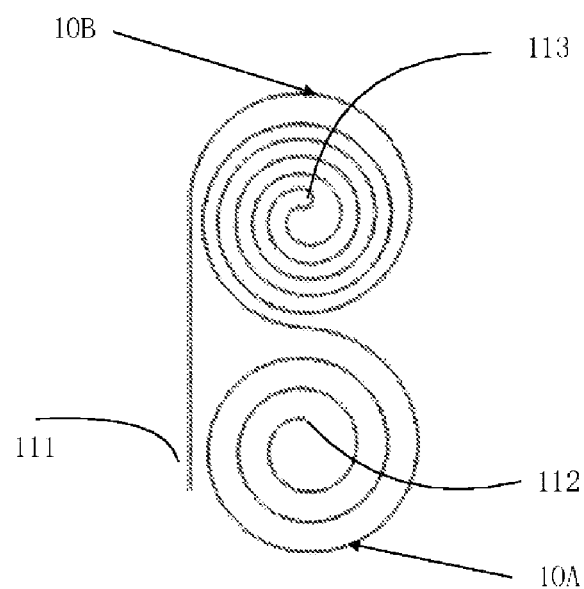
FIG. 5 shows a schematic view of an airbag according to an embodiment of the present invention.

FIG. 5 shows a schematic view of an airbag according to an embodiment of the present invention. The airbag according to the embodiment of the present invention will be described below with reference to FIG. 5.

Figure 1:
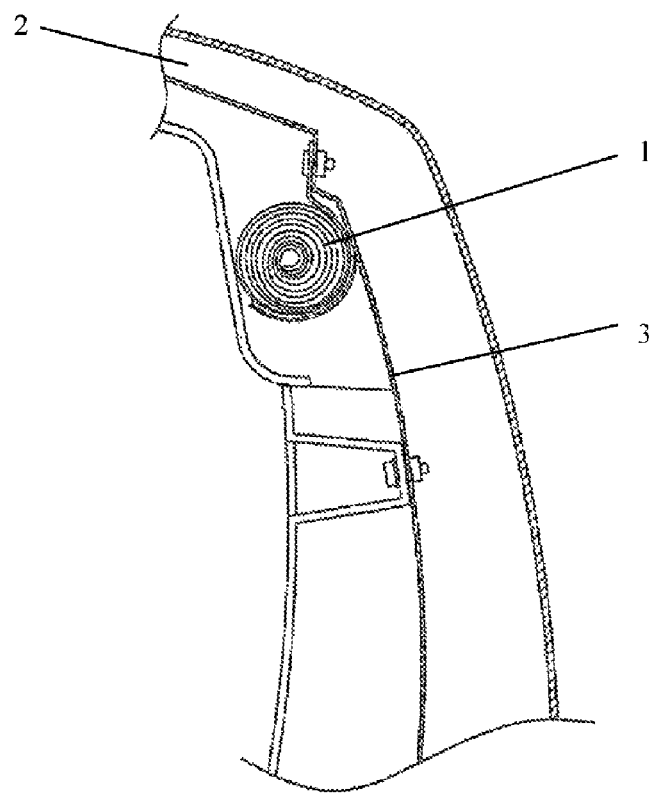
FIG. 1 shows a schematic view of a mounting position of an airbag 1 in a vehicle when viewed from a length direction of the vehicle according to the prior art, the airbag 1 being in a stored state.
Figure 2:
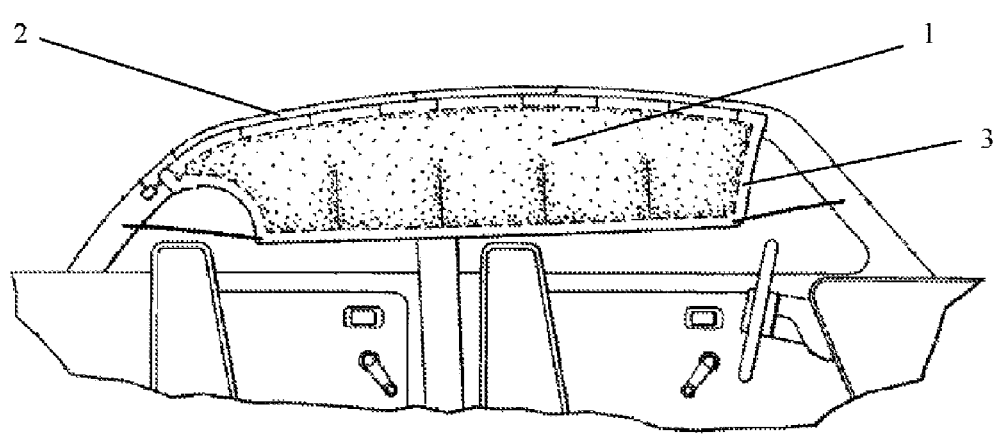
FIG. 2 shows a schematic view of a position of the airbag 1 in the vehicle when viewed from a width direction of the vehicle according to the prior art, the airbag being in a deployed state.

As shown in FIG. 5, the airbag 10 is in a stored state. When in a stored state, the airbag 10 has a first end 111, a second end 112, and a third end 113, wherein the third end 113 is formed by folding the airbag 10 between the first end 111 and the second end 112, the second end 112 and the third end 113 are free ends of the airbag 10, and the first end 111 is used for fixing the airbag to a mounting position. The mounting position of the airbag 10 shown in FIG. 5 in a vehicle can refer to the mounting position of the curtain airbag 1 shown in FIGS. 1 and 2. That is, the airbag 10 is located in a space under a vehicle side structure (e.g., a side door) and an inner roof.

Moreover, when in a stored state, the airbag 10 has a first rolled portion 10A and a second rolled portion 10B arranged above the first rolled portion, the second end 112 is located in the first rolled portion 10A, the third end 113 is located in the second rolled portion 10B, the second end 112 is located outside of the second rolled portion 10B, and the third end 113 is located outside of the first rolled portion 10A. According to the embodiment shown in FIG. 5, the first rolled portion 10A and the second rolled portion 10B have the same rolling direction, i.e. the rolling direction is counterclockwise; and the cross-sectional area of the first rolled portion 10A is equal to that of the second rolled portion 10B, and the first rolled portion 10A and the second rolled portion 10B abut against each other.

A person skilled in the art can understand that the embodiment described above is only an example. For example, the first end 111 may be a free end, and the second end 112 may be used for fixing the airbag to a mounting position. In this case, the first end 111 is located in the first rolled portion 10A, the third end 113 is located in the second rolled portion 10B, the first end 111 is located outside of the second rolled portion 10B, and the third end 113 is located outside of the first rolled portion 10A.

Figure 3A:
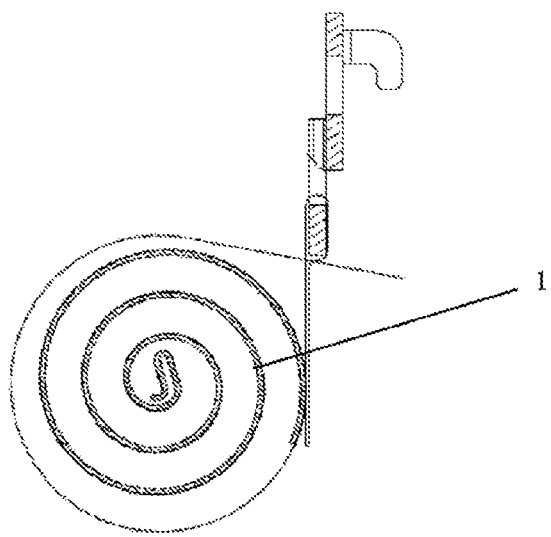
FIGS. 3A and 3B show a schematic side sectional view of the roll-folding manner performed on the airbag 1 according to the prior art.
Figure 3B:
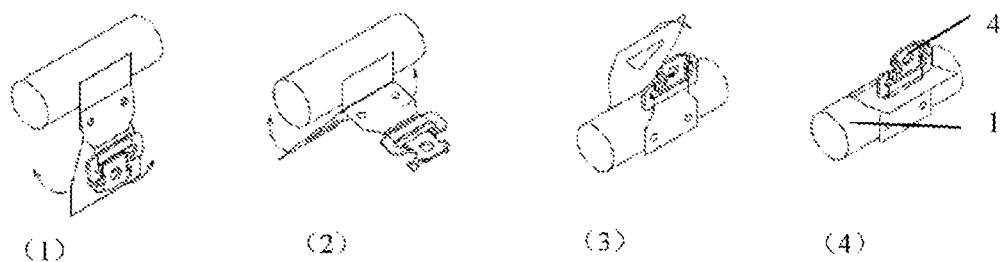
Figure 4:
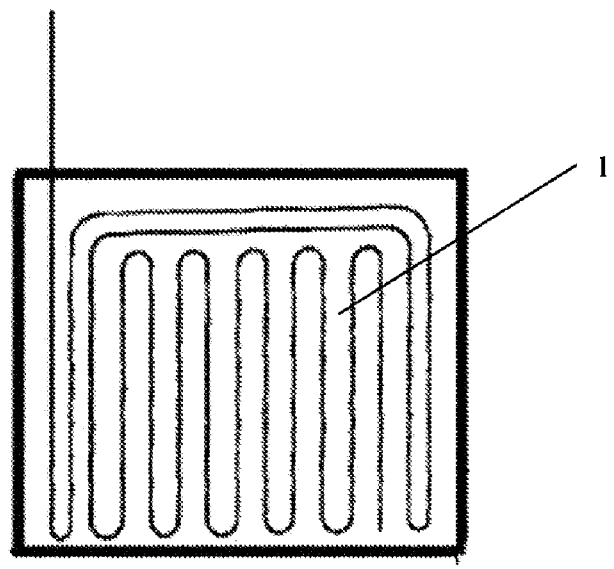
FIG. 4 shows a schematic side sectional view of the N-shaped folding manner performed on the airbag 1 according to the prior art.

The airbag 10 according to the embodiment of the present invention has two rolled portions, i.e. a first rolled portion 10A and a second rolled portion 10B arranged above the first rolled portion. Therefore, compared with the airbag 1 in FIG. 3A, the airbag 10 according to the present invention has an elongated structure as shown in FIG. 5. That is, the airbag 10 according to the present invention has a size smaller than that of the airbag 1 of the prior art in a transverse direction shown in FIGS. 5 and 3, and the airbag 10 according to the present invention has a size greater than that of the airbag 1 of the prior art in a longitudinal direction shown in FIGS. 5 and 3. Moreover, from the mounting space of the curtain airbag 1 in a vehicle shown in FIGS. 1 and 2, it is easy to see that the airbag 10 according to the present invention having an elongated structure can occupy the mounting space more efficiently.

When the airbag 10 needs to be deployed in an inflated state, for example, in the event of a vehicle accident, the airbag 10 is inflated so as to be expanded and deployed downward along a vehicle side structure 3; and the second end 112 and the third end 113 are successively deployed to form free ends so as to provide protection for occupants in an occupant protection region.

Figure 6A:
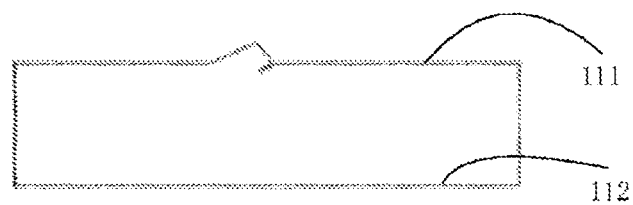
FIGS. 6A-6D show a folding method for an airbag according to an embodiment of the present invention.
Figure 6B:
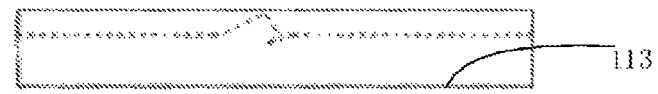
Figure 6C:
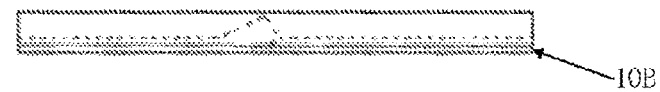
Figure 6D:

In addition, as an example, FIGS. 6A-6D show a folding method for an airbag according to an embodiment of the present invention. When the airbag 10 shown in the embodiment in FIG. 5 is manufactured, as shown in FIGS. 6A and 6B, firstly, the second end 112 may be moved close to the first end 111 to fold the airbag 10, so as to form the third end 113 of the airbag 10. Then, as shown in FIGS. 6C and 6D, a portion of the airbag 10 is rolled in a counterclockwise rolling direction as viewed in a right view of FIG. 6 by using the second end 112 and the third end 113 as starting points respectively, so as to form the first rolled portion 10A and the second rolled portion 10B, wherein the second end 112 is located outside of the second rolled portion 10B and the third end 113 is located outside of the first rolled portion 10A. In addition, as shown in FIG. 5, the first rolled portion 10A and the second rolled portion 10B are rolled to have an identical cross section; and the first rolled portion 10A and the second rolled portion 10B are rolled to abut against each other. However, a person skilled in the art can understand that the airbag of the present invention is not limited thereto. For example, according to actual conditions, the first rolled portion and the second rolled portion may have different cross sections; and the first rolled portion and the second rolled portion may be spaced apart.

Figure 7A:
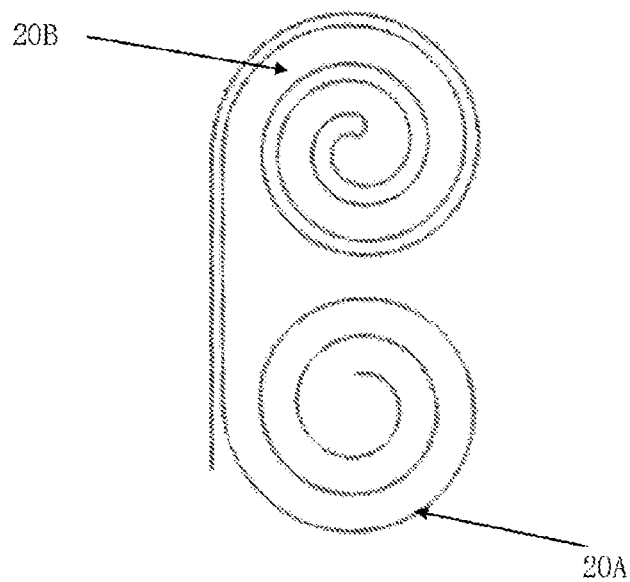
FIGS. 7A-7D show schematic views of airbags according to other embodiments of the present invention.
Figure 7B:
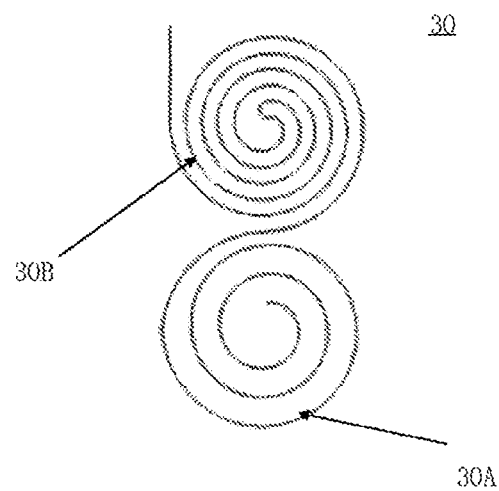
Figure 7C:
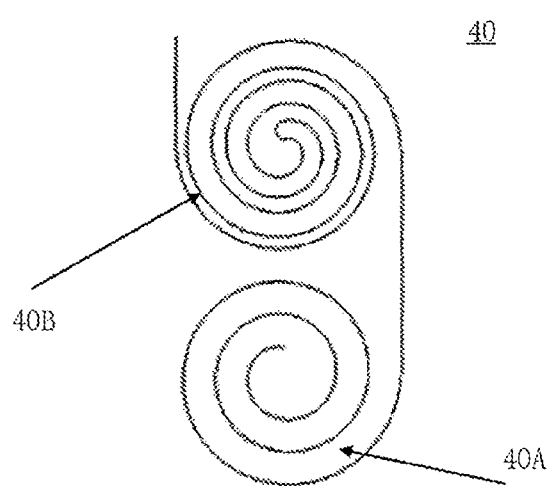
Figure 7D:
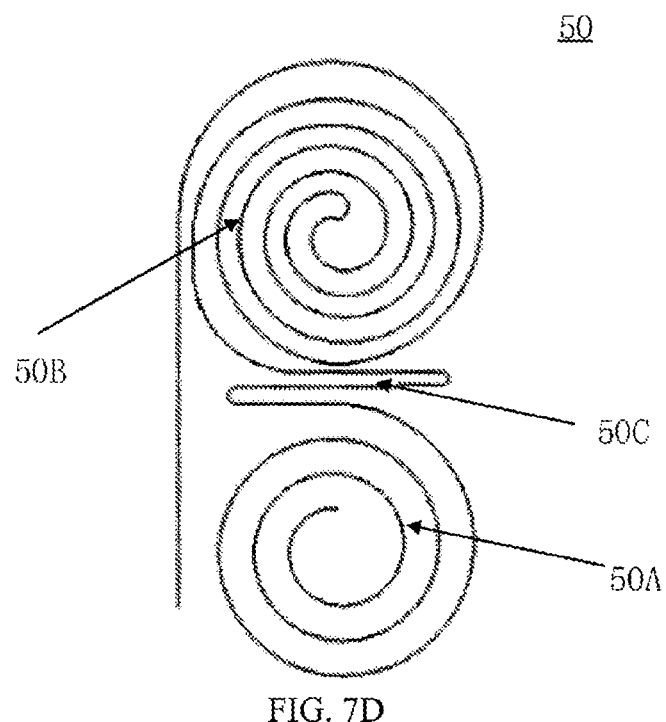

A person skilled in the art can understand that the first rolled portion and the second rolled portion of the airbag of the present invention are not limited to having the same rolling direction. The two portions may have opposite rolling directions. For example, in the embodiment shown in FIG. 6, a portion of an airbag 20 is rolled in a counterclockwise rolling direction as viewed in the right view of FIG. 6 by using the third end 113 as a starting point, so as to form a second rolled portion 20B; and a portion of the airbag 20 is rolled in a clockwise rolling direction as viewed in the right view of FIG. 6 by using the second end 112 as a starting point, so as to form a first rolled portion 20A, as shown in FIG. 7A. Alternatively, in the embodiment shown in FIG. 6, a portion of an airbag 30 is rolled in a clockwise rolling direction as viewed in the right view of FIG. 6 by using the third end 113 as a starting point, so as to form a second rolled portion 30B; and a portion of the airbag 30 is rolled in a clockwise rolling direction as viewed in the right view of FIG. 6 by using the second end 112 as a starting point, so as to form a first rolled portion 30A, as shown in FIG. 7B. Alternatively, in the embodiment shown in FIG. 6, a portion of the airbag 10 is rolled in a clockwise rolling direction as viewed in the right view of FIG. 6 by using the third end 113 as a starting point, so as to form a second rolled portion 40B; and a portion of the airbag 10 is rolled in a counterclockwise rolling direction as viewed in the right view of FIG. 6 by using the second end 112 as a starting point, so as to form a first rolled portion 40A, as shown in FIG. 7C. In addition to the first rolled portion and the second rolled portion, the airbag of the present invention may further comprise a folded portion 50C, both ends of which are connected to a first rolled portion 50A and a second rolled portion 50B respectively, wherein the folded portion 50C is formed in an N-shape folding manner, as shown in FIG. 7D.

In addition to the airbag described above, the present invention further provides an airbag assembly. The airbag assembly comprises a gas generator and the airbag according to the foregoing embodiments. The gas generator is used to inflate the airbag when detonated, so as to inflate and deploy the airbag.

Figure 8:
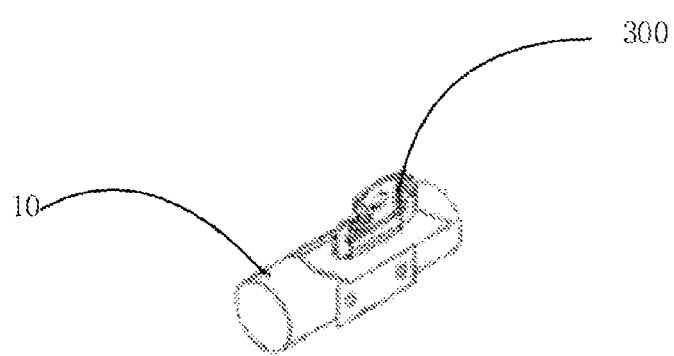
FIG. 8 shows a schematic view of a fastener for fixing the airbag to a mounting position according to the present invention.

More specifically, the airbag assembly may further comprise a fastener 300 for fixing the airbag to a corresponding mounting position. As shown in FIG. 8, a schematic view of the vicinity of the fastener 300 is shown. In FIG. 8, the airbag 10 is not fully shown, but only one section thereof near the fastener 300 is shown. A portion of the fastener 300 is fixed to the first end of the airbag (not shown in the drawing) and surrounds the airbag 10. The other portion of the fastener 300 protrudes through an opening of an end of the fastener to surround the outer periphery of the airbag. The protruded portion can be used for fixing the airbag to the corresponding mounting position. Thus, the fastener 300 can maintain the shape of the airbag 10 and can facilitate mounting the airbag assembly.

A person skilled in the art can understand that the mounting device of the airbag assembly is not limited to the above-described fastener. According to specific situations, a person skilled in the art can use any mounting device that can fix the airbag to a predetermined mounting position in the vehicle. For example, according to specific application scenarios, the airbag can be fixed to the predetermined mounting position in the vehicle by means of recessed or hooked members and the like and/or by means of riveting, bonding, fastening, and the like.

As described above, although the exemplary embodiments of the present invention have been described with reference to the accompanying drawings in the description, the present invention is not limited to the aforementioned specific implementations. The protection scope of the present invention should be defined by the claims and the equivalent meanings thereof.

The invention claimed is:

1. An airbag for a vehicle, the airbag comprising:
a first end, a second end, and a third end, the third end formed by folding the airbag between the first end and the second end, the second end and the third end are free ends of the airbag, and the first end is adapted for fixing the airbag to a mounting position; and
the airbag further includes a first rolled portion and a second rolled portion when in a stored state, the second end located in the first rolled portion, the third end located in the second rolled portion, the second end located outside of the second rolled portion, and the third end located outside of the first rolled portion,
wherein the airbag directly extends from the first end to an outermost portion of the second rolled portion and then to the third end, and
wherein the airbag is a curtain airbag, the first end is attached to a side structure of the vehicle, the airbag configured to downwardly deploy along the side structure of the vehicle.

2. The airbag according to claim 1, wherein the first rolled portion and the second rolled portion have a same rolling direction.

3. The airbag according to claim 2, wherein a first cross-sectional area of the first rolled portion is equal to a second cross-sectional area of the second rolled portion when the airbag is in a stored state.

4. The airbag according to claim 3, wherein the first rolled portion and the second rolled portion abut against each other when the airbag is in the stored state.

5. The airbag of claim 1, in combination with an airbag assembly, the airbag assembly further comprising:
a mounting device configured to fix the airbag to a corresponding mounting position, the mounting device being fixed to the first end of the airbag.

6. The airbag assembly according to claim 5, wherein the mounting device is configured as a fastener surrounding the airbag, and a portion of the fastener is fixed to the first end of the airbag assembly.

7. The airbag assembly according to claim 5, wherein the first rolled portion and the second rolled portion have a same rolling direction.

8. The airbag assembly according to claim 7, wherein a first cross-sectional area of the first rolled portion is equal to a second cross-sectional area of the second rolled portion when the airbag is in a stored state.

9. The airbag assembly according to claim 8, wherein the first rolled portion and the second rolled portion abut against each other when the airbag is in the stored state.

10. A method of folding the airbag of claim 1, the method comprising:
moving the second end close to the first end to fold the airbag, so as to form the third end of the airbag; and
rolling a portion of the airbag by respectively using the second end and the third end as starting points, so as to form the first rolled portion and the second rolled portion.

11. The airbag according to claim 1, wherein the second rolled portion is positioned above the first rolled portion and the first end is on a vehicle outboard side of the first and second rolled portions.

* * * * *